UNITED STATES PATENT OFFICE.

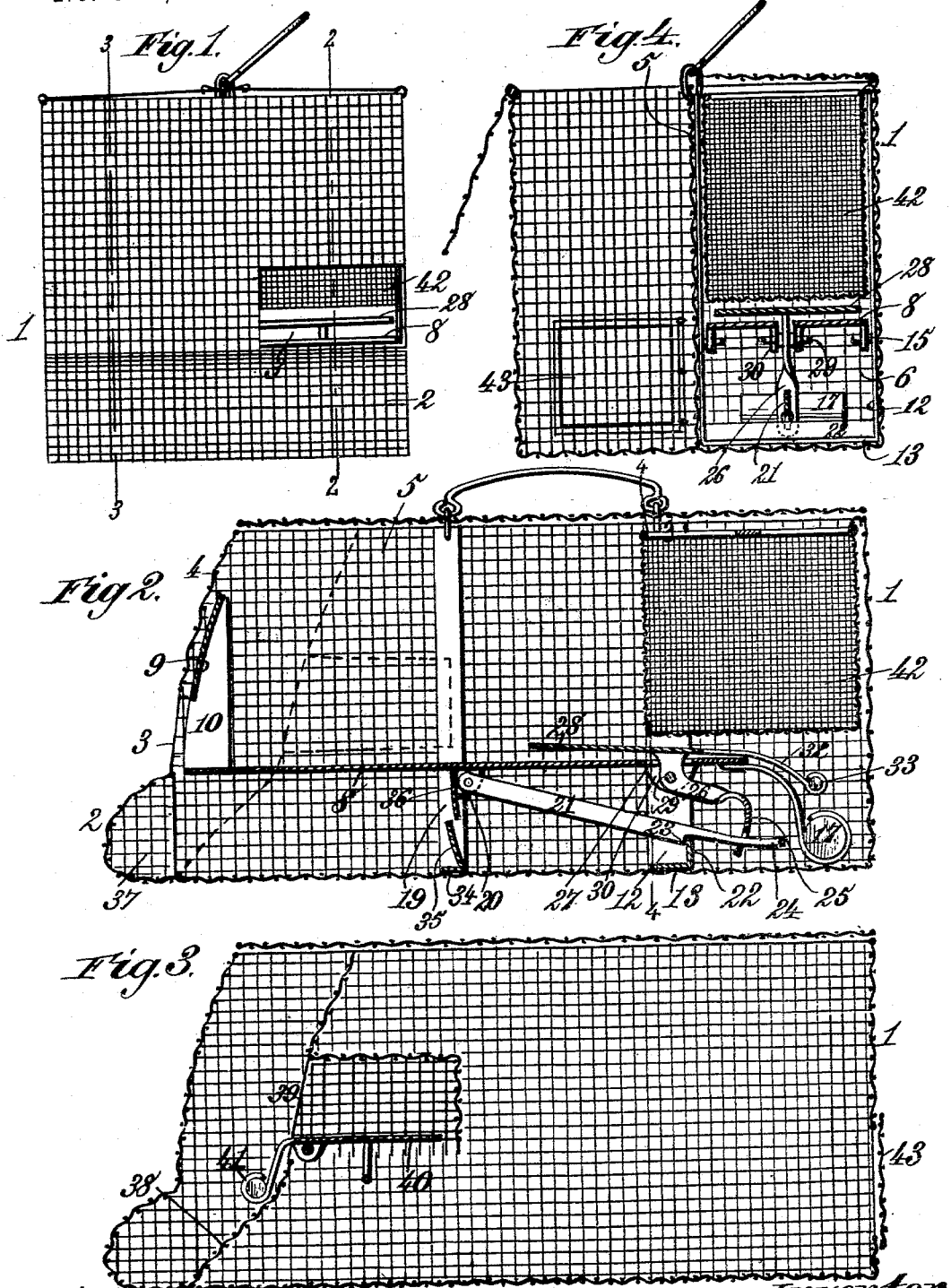

WILLIAM H. SALLEE, OF COLUMBIA, KENTUCKY, ASSIGNOR OF ONE-HALF TO CHARLES M. SALLEE, OF SAME PLACE.

RAT-TRAP.

SPECIFICATION forming part of Letters Patent No. 546,250, dated September 10, 1895.

Application filed July 3, 1895. Serial No. 554,853. (No model.)

*To all whom it may concern:*

Be it known that I, WILLIAM H. SALLEE, a citizen of the United States, residing at Columbia, in the county of Adair and State of Kentucky, have invented new and useful Improvements in Rat-Traps, of which the following is a specification.

My invention relates to rat-traps, my purpose being to provide an improved construction whereby rats will readily enter without fear, being tempted thereto by a bait, which can be seen and smelled, but which is inaccessible, and which cannot, therefore, be destroyed or consumed by the rats first caged, thus leaving the bait to attract other rats who may come subsequently within its influence.

It is my purpose, also, to provide an open hallway or entrance in a rat-trap, the floor of the same being formed of a shelf pivotally supported at or near one end and provided at the other end with a gate adapted to close the entrance or door, the floor being supported, normally, by a trigger which cannot be sprung until the rat is wholly within the trap, provision being made whereby the rat, after the gate has closed, may, and naturally will, pass into and be retained by a lateral chamber which is capable of containing a number of such rats where they cannot interfere with or obstruct the operation of the trigger or the pivoted floor and gate.

It is a further purpose of my invention to improve the construction and operation of rat-traps of this type, and to provide a trap with a bait-basket or inclosure of such form that while the bait shall be fully exposed to view it shall be wholly inaccessible, thereby enabling the use of living bait.

Finally, it is my purpose to provide a simple and economical construction whereby the trap may consist of few parts, having the utmost simplicity of form and operation, not liable to get out of order, sure to operate, and requiring but a small quantity of material for its completion.

The invention consists, to these ends, in the novel features of construction and new combinations of parts, hereinafter fully explained, and then particularly pointed out and defined in the claims.

To enable others to fully understand my said invention I will now proceed to describe the same in detail, reference being had for this purpose to the accompanying drawings, in which—

Figure 1 is a front elevation of my improved trap. Fig. 2 is a longitudinal section on the line 2 2 of Fig. 1. Fig. 3 is a similar section on the line 3 3 of Fig. 1. Fig. 4 is a transverse vertical section on the line 4 4 of Fig. 2.

The reference-numeral 1 in said drawings indicates the body of the trap, which is of substantially rectangular form, save as to the entrance end thereof, which is curved outwardly from the bottom wall of the trap to a point in the same horizontal plane as the pivotal floor, thus forming a species of extension 2, which is of advantage in enabling the animal caught to readily mount the extension and reach the entrance or gateway 3. Above the extension 2 the end wall 4 of the trap is curved or convexed outward, the line of its curvature being an arc struck from the pivotal axis of the floor of the trap. The body of the trap is divided by a longitudinal vertical partition 5 into two substantially equal parts, and said partition, as well as the walls of the trap, are formed preferably of wire, either woven or united by solder or other suitable means to form a meshed fabric of proper strength.

In one of the chambers—as, for example, the chamber 6, formed by the longitudinal partition 5—is a floor 8, arranged in or nearly in the same horizontal plane with the top of the curved extension 2. At the end adjacent to said extension the floor has no support save that hereinafter explained, and said end is provided with a gate 9, mounted upon side supports 10. The gate and side supports are curved in parallelism with the curved end of the trap, and as close to the latter as is consistent with free vertical vibration.

Between the middle of the chamber 6 and its rearward end are arranged two parallel uprights 12, lying on opposite sides of the chamber in which the floor 8 is arranged and connected at their lower ends by a cross-piece 13, having a vertical rib or upwardly-turned edge 22. Between these uprights the floor 8 is pivoted upon trunnions 15, which lie in seats in the uprights 12. Between the point of pivotal support and the rear end of the chamber the floor is curved or inclined downward toward the angle between the base and rear wall of the chamber, and its end is weighted, as at 17, the weight being sufficient to overbalance the floor 8 and gate 9, whereby the floor is held normally in line with the bottom of the entrance-opening 3 in the curved end of the chamber. This brings the gate 9 just above the top of the said entrance-opening.

At a point about half way between the uprights 12 and the gate 9 a second pair of uprights 19 is arranged, the floor 8 passing between them. Dropping from the lower surface of the floor in its central longitudinal line is a lug 20, upon which is pivoted one end of a trigger-bar 21. This bar extends rearward with a downward inclination, and crosses the upper edge of a rib or plate 22, which extends between the lower portions of the uprights 12. A shoulder 23 is formed in or upon the said bar at such a point that when said shoulder lies in front of and against said rib or plate it will sustain the floor 8 in the position shown in Fig. 2, with its entrance end substantially in line with the bottom or threshold of the entrance-opening 3. A reduced prolongation 24, forming part of the trigger-bar, extends over and beyond the rib or plate 22 toward the rear, its end lying in an eye or loop 25, formed in the end of a tripping-bar 26. From its eye or loop 25 said tripping-bar curves or inclines upward and toward the uprights 12, its upper portion passing through a central longitudinal slot 27 in the floor 8 and uniting rigidly with a tripping-plate 28, which lies between the uprights 12 and just above the floor 8. It is supported by a transverse pivot 29, which has bearing in lugs 30, which are preferably formed from the metal of the floor. In rear of the pivotal point a tongue 32 extends rearward, and a weight 33 is provided at its end, which will normally raise the tripping-plate somewhat above the floor and depress the eye or loop 25 far enough to permit the shoulder 23 to engage the rib or plate 22. The reduced prolongation 24 has free play in the eye or loop 25, and when any pressure is exerted upon the tripping-plate it will lift the trigger-bar and disengage its shoulder 25, whereupon the floor 8 will drop by the weight of the animal entering the trap and stepping upon the tripping-plate.

From a transverse piece 34, between the lower ends of the uprights 19, a shield-plate 35 is curved upward, a second plate 36 being arranged on the under side of the floor 8 and curved downwardly to move in a parallel arc and in close proximity to the plate 35. These two plates effectually cut off all passage from the rear to the front of the chamber and prevent a rat from obstructing the action of the floor.

In the longitudinal partition, close to the curved extension 2, is an opening 37, which is made accessible by the fall of the floor, by which the gate is caused to close the entrance-opening. This opening 37 gives passage to the adjacent chamber 7, to which a rat, when caged, will naturally pass. After entering said adjacent chamber, he is confronted by an inclined way 38, which leads to a trap-hole 39, having for its floor a pivoted plate 40. This plate is provided with a weight 41, which normally closes it, but any slight weight on said floor will cause it to drop, precipitating a rat standing on the floor 40 into the chamber 6, in which is the floor 8. As the floor 40 closes at once, there is no escape, and the rats as they are caught will pass into and be retained by the chamber 7 until it is filled.

The bait is placed in the bait-basket 42, formed of wire fabric and placed at such a point as to tempt the rat to enter and pass over the floor 8 until a step upon the trigger-plate releases said floor, leaving the rat no alternative but to pass through the opening 37 and trap-hole 39.

The trap may be adapted for catching animals of any size by merely enlarging the capacity and parts of the trap.

The rats after passing through the trap-hole into the closed chamber may be removed by any preferred means, such as the hinged door or end wall 43 shown in the drawings.

What I claim is—

1. A rat-trap comprising two adjacent chambers, separated by a longitudinal partition, one chamber having a floor pivoted and suitably weighted, its vibrating end provided with a gate adapted to close an entrance-opening, a trigger-bar pivotally connected at one end to said floor and having a shoulder near the other end to engage a transverse rib, or plate, a tripping-bar having an eye, or loop, to receive the reduced prolongation of the tripping bar, and a tripping-plate rigid with the tripping-bar and pivotally supported above and by the floor, the separating partition having an opening which is disclosed by the drop of the pivoted floor, substantially as described.

2. A rat-trap, consisting of two adjacent chambers, a pivoted and weighted floor in one chamber, its vibrating end having a gate adapted to close an entrance to the trap, a trigger-bar pivotally connected to lugs on the lower face of the floor and provided with a shoulder to engage a transverse rib, or plate, and a tripping-plate lying above the floor, and having a tripping-bar rigid therewith, its end having an eye or loop to receive a prolongation of the trigger-bar, substantially as described.

3. In a rat-trap, having two adjacent chambers communicating by an opening in a separating partition at the forward, or entrance end of the trap, a floor pivoted and weighted in one chamber and having a gate normally standing above the entrance opening, the floor being normally above the opening in the partition, and a trigger-bar pivoted at one end to the lower face of the floor forward of its pivotal point, said bar having a shoulder to engage a transverse rib and support the floor, a tripping-bar having an eye or loop to loosely receive a prolongation of the tripping bar, a tripping plate arranged above the floor and rigid with the tripping-bar, said tripping bar being pivoted between lugs dropped from the floor, substantially as described.

4. In a rat-trap, the combination with two adjacent chambers of a floor pivoted in one and having a gate normally lying above an entrance opening, a trigger-bar, a tripping-bar and plate the bar being loosely connected to the trigger-bar, and the tripping plate being operated by the weight of the rat to trip the trigger-bar, drop the floor, close the entrance and disclose an opening in the partition between the chambers, a trap-hole being provided in the adjacent chamber and a pivoted, normally closed floor for said trap-hole, substantially as described.

In testimony whereof I have hereunto set my hand in presence of two subscribing witnesses.

WILLIAM H. SALLEE.

Witnesses:
R. G. COFFEY,
J. H. HOLLADAY.